Patented Aug. 27, 1940

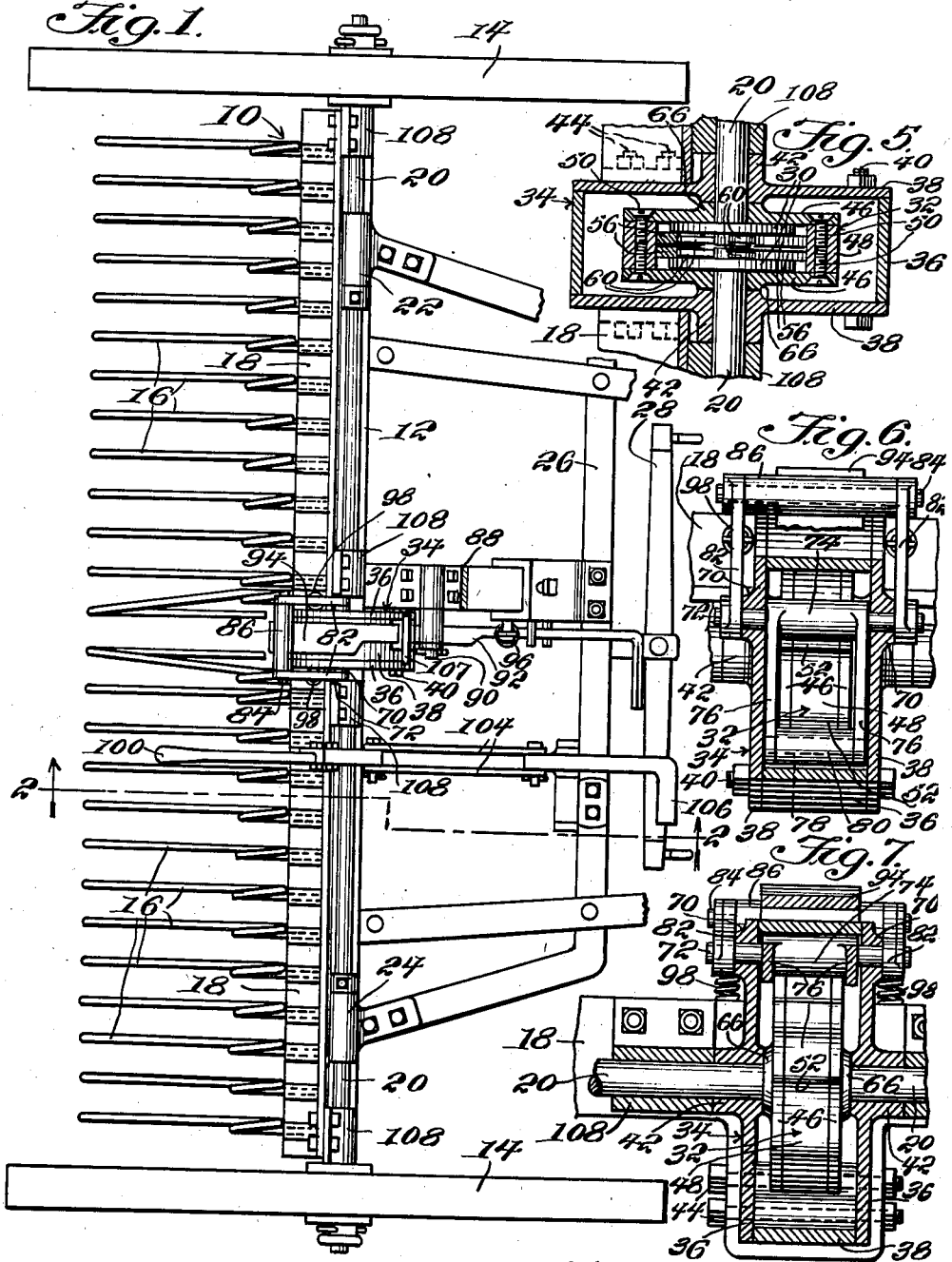

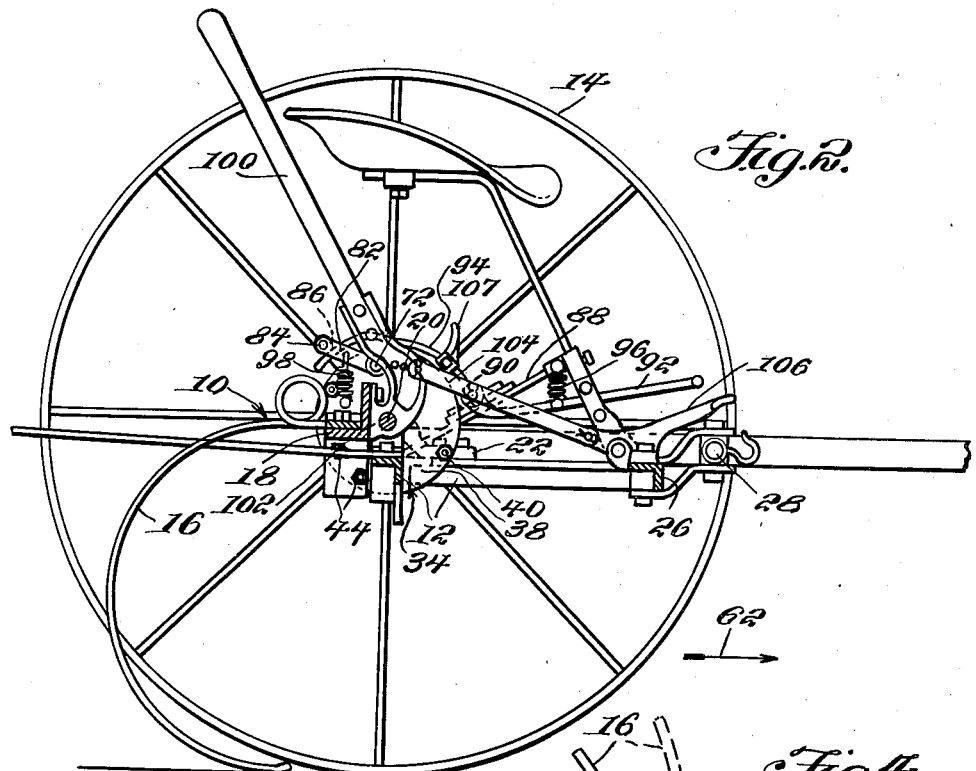
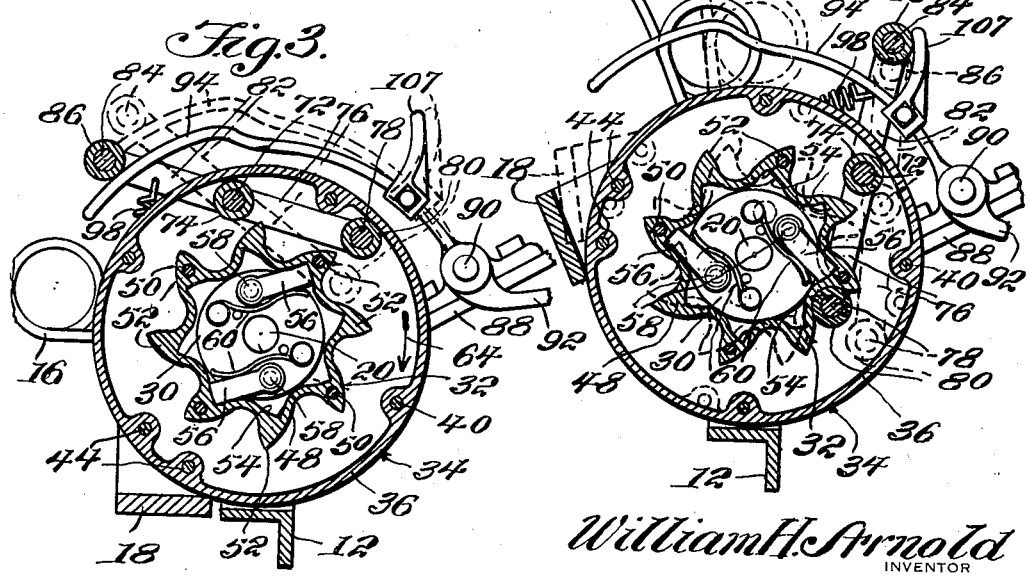

2,212,973

UNITED STATES PATENT OFFICE 2,212,973

HAY RAKE

William Howard Arnold, Laramie, Wyo.

Application January 31, 1939, Serial No. 253,888

2 Claims. (Cl. 56—391)

My invention relates to hay rakes, and has among its objects and advantages the provision of an improved dumping and tripping mechanism.

In the accompanying drawings:

Figure 1 is a top plan view of a rake in accordance with my invention;

Figure 2 is a sectional view along the line 2—2 of Figure 1;

Figure 3 is a sectional view of the dumping and tripping mechanism;

Figure 4 is a similar view illustrating the release position of the tripping mechanism;

Figure 5 is a sectional detail view of the housing structure enclosing a portion of the dumping and tripping mechanism;

Figure 6 is an elevational view of the structure of Figure 3; and

Figure 7 is a view similar to Figure 6 taken from a different position.

In the embodiment selected to illustrate my invention, the hay rake 10 includes a frame 12 supported on wheels 14. The rake tines 16 are carried by a dump frame 18 which is pivotally mounted on the frame 12. Each wheel 14 is keyed to an axle shaft 20, which shafts are arranged in axial alignment longitudinally of the frame 12 and are rotatably related thereto through the medium of bearings 22 and 24. Frame 12 includes a frame 26 to which the draft equipment 28 is connected.

Axle shafts 20 are preferably of equal lengths, and the inner end of each shaft is provided with a fixedly related flange 30, which flanges are of the same diameters and spaced in the manner illustrated in Figure 5. Both flanges are enclosed in the trip housing 32. Trip housing 32 is enclosed in an outer housing 34. Outer housing 34 comprises a peripheral wall 36 and side walls 38 fixedly connected into a unitary structure through the medium of bolts 40. Each side wall 38 is provided with a bearing 42 for accommodating one of the axle shafts 20.

Dump frame 18 is bolted to the outer housing 34, as illustrated at 44 in Figure 2. Trip housing 32 includes side plates 46 and a wall 48 positioned between the wall 36 and fixedly related thereto through the medium of screws 50 passing through openings in the side walls and threaded into the wall 48. Referring to Figures 3 and 4, the peripheries of the walls 46 and the wall 48 are fashioned to provide teeth 52, and the inner face of the wall 48 is fashioned to provide notches 54. Each flange 30 is provided with two dogs 56 pivoted thereto at one end as at 58. The outer ends of the dogs 56 are urged into pressure relation with the inner face of the wall 48 through the medium of springs 60. Thus the outer ends of the dogs may take positions in aligned notches 54 as illustrated in Figure 3. Movement of the rake bodily in the direction of the arrow 62 of Figure 2 rotates the disc 30 illustrated in Figure 3 in the direction of the arrow 64, at which time the dogs 56 impart rotation to the trip housing 32. Figures 3 and 4 illustrate one of the discs 30 only, but both discs are of identical construction and operation so that the description of one will apply to both.

According to Figure 5, the side walls 46 are provided with bearings 66 for rotatably relating the trip housing to the axle shafts 20. During straight travel of the rake, the dogs 56 associated with both of the discs 30 will of course have driving relation with the trip housing 32. Under such conditions the trip housing will of course rotate with the axle shafts as a unit. When the rake is turned or moved in a circular path one disc 30 will of course be rotated faster than the other disc, but the slow moving disc will under such conditions offer no resistance because of the yielding nature of the dogs 56 associated therewith.

Referring to Figures 3 and 6, walls 38 of the outer housing 34 are provided with bearings 70 which rotatably support a shaft 72 having a sleeve 74 keyed thereto and provided with parallel arms 76 which carry a shaft 78 upon which I mount a roller sleeve 80 arranged to be moved into engagement with the teeth 52. Normally the roller sleeve 80 is positioned in the full line illustration of Figure 3 entirely in the clear of the teeth 52. To each end of the shaft 72 I fixedly connect an arm 82, each of which arms is connected with a shaft 84 upon which I mount a roller sleeve 86. It will thus be seen that the roller sleeve 80 is positioned inside the outer housing 34, and that the roller sleeve 86 is positioned exteriorly of the housing. However, arms 76 are connected as a unit with the arms 82 through the medium of the rotary shaft 72 which unit may be defined as a trip yoke.

To a frame member 88 I pivotally mount at 90 a foot actuated trip lever 92 having a reach 94 curved partly about the outer housing 34. Trip lever 92 is resiliently supported in the normal position of Figure 2 through the medium of a tension spring 96. In addition, the sleeve roller 86 lies upon the reach 94 and is urged thereagainst through the medium of tension springs 98 connected with the arms 82 and the plates 38 of the outer housing 34.

A hand actuated lever 100 is pivotally mounted on one of the axle shafts 20 and is fixedly connected at 102 with the dump frame 18. Thus the dump frame may be pivoted about the axes of the axle shafts 20 through manual manipulation of the lever 100. This lever is also connected with a link 104 pivotally connected with a foot lever 106 through the medium of which the dump frame 18 may be pivoted in a counter-clockwise direction when viewing Figure 2 for holding the rake tines 16 in effective pressure relation with the ground. Dump frame 18 is pivotally mounted on the axle shafts 20 through the medium of bearings 108.

In operation, the rake may be dumped by exerting slight foot pressure on the lever 92 which causes the reach 94 to pivot the arms 82 to the dotted line position of Figure 3. Such pivotal movement of the arms will bring the roller sleeve 80 into the path of the teeth 52. As the roller sleeve is engaged by one of the teeth, the trip housing 32 is latched to the outer housing 34, the latter being fixedly connected with the dump frame 18 so that rotation of the outer housing 34 will cause the dump frame 18 to pivot about the axes of the axle shafts 20 in a clockwise direction when viewing Figure 2 for moving the tines 16 to abutting positions. Reach 94 is provided with a trigger 107 arranged in the path of the sleeve 86 for engaging the sleeve when moved to the position of Figure 4. A slight continued rotation of the outer housing 34 when positioned according to Figure 4 will cam the arms 82 to the dotted line positions illustrated therein for moving the roller sleeve 80 out of connected relation with the tooth 52 for unlatching the trip housing 32 from the outer housing 34 so that the dump frame 18 may be freed and dropped to the position of Figure 2.

I provide a rake in which the dump mechanism is designed as a unit located intermediate the wheels 14. The dump mechanism constitutes a simple unit which functions to dump the rake in an efficient manner. Trip housing 32 as well as the outer housing 34 may be supplied with a suitable quantity of lubricating oil or grease for effectively lubricating the parts housed therein. The trip yoke is easily actuated through the medium of the foot operated lever 92 and is effectively latched to the inner housing 32 upon a slight downward movement of the lever 92.

I claim:

1. A rake comprising a supporting frame, supporting wheels each having a shaft fixedly connected therewith and rotatably journaled on said supporting frame, a dump frame mounted for pivotal movement about the axes of said shafts and having tines, a trip housing having axially aligned bearings, each of said shafts having an end extending loosely through one of said bearings and provided with a flange located inside the trip housing, said trip housing having internal notches, spring-pressed dogs carried by said flanges for engagement with said notches to connect either or both of said shafts with the trip housing for rotating the latter with one or both of said supporting wheels, external teeth on said trip housing, an outer housing enclosing said trip housing and having bearings loosely embracing said shafts, a first lever located inside said outer housing and having an element adapted to have latched engagement with said external teeth, said first lever being fixedly connected with a shaft extending through an opening in said outer housing, a second lever located exteriorly of said outer housing and fixedly connected with said last-mentioned shaft, a manually actuated lever pivotally mounted on said supporting frame and having an end operatively engaging said second lever for pivoting said last-mentioned shaft to move said first lever for bringing said element into latched engagement with one of said external teeth for pivoting the dump frame and the tines to a dumping position, and means mounted on said manually actuated lever for engaging said second lever to shift said first lever for bringing said element in the clear of said teeth.

2. A rake comprising a supporting frame, supporting wheels each having a shaft fixedly connected therewith and rotatably journaled on said supporting frame, a dump frame mounted for pivotal movement about the axes of said shafts and having tines, a trip housing having axially aligned bearings, each of said shafts having an end extending loosely through one of said bearings and provided with a flange located inside the trip housing, said trip housing having internal notches, spring-pressed dogs carried by said flanges for engagement with said notches to connect either or both of said shafts with the trip housing for rotating the latter with one or both of said supporting wheels, external teeth on said trip housing, an outer housing enclosing said trip housing and having bearings loosely embracing said shafts, a first lever located inside said outer housing and having an element adapted to have latched engagement with said external teeth, said first lever being fixedly connected with a shaft extending through axially aligned openings in said outer housing, second levers located exteriorly of said outer housing and fixedly connected with said last-mentioned shaft, a cross element carried by the ends of said second levers remote from said last-mentioned shaft, a manually actuated lever pivotally mounted on said supporting frame and having an end extending between said second levers and underneath said cross element for pivoting said last-mentioned shaft to move said first lever for bringing said first-mentioned element into latched engagement with one of said external teeth for pivoting the dump frame and the tines to a dumping position, resilient means acting on said outer housing and at least on one of said second levers for yieldingly holding the latter in normal positions with said first-mentioned element positioned in the clear of said teeth, and means mounted on said manually actuated lever for engaging said second lever to pivot the first lever for bringing said first-mentioned element in the clear of said teeth.

WILLIAM HOWARD ARNOLD.